(12) United States Patent
Morioka (10) Patent No.: US 11,394,516 B2
(45) Date of Patent: Jul. 19, 2022

(54) COMMUNICATION APPARATUS AND COMMUNICATION METHOD

(71) Applicant: Sony Corporation, Tokyo (JP)

(72) Inventor: Yuichi Morioka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 56 days.

(21) Appl. No.: 16/967,736

(22) PCT Filed: Dec. 10, 2018

(86) PCT No.: PCT/JP2018/045374
§ 371 (c)(1),
(2) Date: Aug. 6, 2020

(87) PCT Pub. No.: WO2019/159515
PCT Pub. Date: Aug. 22, 2019

(65) Prior Publication Data
US 2021/0044410 A1 Feb. 11, 2021

(30) Foreign Application Priority Data
Feb. 13, 2018 (JP) .............................. JP2018-022851

(51) Int. Cl.
*H04L 5/00* (2006.01)
*H04W 4/06* (2009.01)
(Continued)

(52) U.S. Cl.
CPC ............ *H04L 5/0055* (2013.01); *H04L 1/189* (2013.01); *H04L 1/1887* (2013.01); *H04W 4/06* (2013.01); *H04W 84/12* (2013.01)

(58) Field of Classification Search
None
See application file for complete search history.

(56) References Cited

U.S. PATENT DOCUMENTS

2006/0239213 A1* 10/2006 Frederiks ............ H04L 1/1664
370/278
2008/0080464 A1* 4/2008 Speight ............... H04L 1/1854
370/342
(Continued)

FOREIGN PATENT DOCUMENTS

| JP | 2010-537518 A | 12/2010 |
|---|---|---|
| JP | 2012-019459 A | 1/2012 |
| WO | 2017/195458 A1 | 11/2017 |

OTHER PUBLICATIONS

International Search Report and Written Opinion dated Mar. 5, 2019 for PCT/JP2018/045374 filed on Dec. 10, 2018, 6 pages including English Translation of the International Search Report.

*Primary Examiner* — Steve R Young
(74) *Attorney, Agent, or Firm* — Xsensus LLP (57) ABSTRACT

Provided are a communication apparatus and a communication method that enable ACK/NACK (ACKnowledgement/Negative-ACKnowledgement) transmission without complicated connection settings, to thereby realize high-efficiency and high-quality multicast communication.

The communication apparatus includes a communication unit configured to transmit and receive a signal and a control unit configured to control the transmission and reception of the signal. The control unit controls transmission of an induction signal to one or more destination stations to each of which a signal has been transmitted, the induction signal inducing transmission of an ACK/NACK signal with respect to the transmitted signal. The induction signal contains information specifying, of a plurality of continuous frames, frames that are ACK/NACK targets and information associated with a plurality of candidate regions with respect to which the ACK/NACK signal is transmittable.

12 Claims, 8 Drawing Sheets

(51) Int. Cl.
 *H04L 1/18* (2006.01)
 *H04W 84/12* (2009.01)

(56) References Cited

U.S. PATENT DOCUMENTS

| | | | |
|---|---|---|---|
| 2013/0301569 A1* | 11/2013 | Wang | H04L 1/1854 370/329 |
| 2014/0355493 A1* | 12/2014 | Niu | H04L 12/189 370/280 |
| 2015/0312953 A1 | 10/2015 | Wan | |
| 2016/0087775 A1* | 3/2016 | Hedayat | H04L 5/0055 370/329 |
| 2016/0134406 A1* | 5/2016 | Chu | H04L 5/0037 370/329 |
| 2017/0338931 A1 | 11/2017 | Kim | |
| 2018/0212738 A1* | 7/2018 | Chun | H04W 84/12 |
| 2019/0082452 A1* | 3/2019 | Zheng | H04W 72/1289 |
| 2019/0082467 A1 | 3/2019 | Nunome et al. | |

\* cited by examiner

COMMUNICATION APPARATUS AND COMMUNICATION METHOD

CROSS-REFERENCE TO RELATED APPLICATIONS

The present application is based on PCT filing PCT/JP2018/045374, filed Dec. 10, 2018, which claims priority to JP 2018-022851, filed Feb. 13, 2018, the entire contents of each are incorporated herein by reference.

TECHNICAL FIELD

The technology disclosed herein relates to a communication apparatus and a communication method that realize high-efficiency and high-quality multicast communication.

BACKGROUND ART

Recently, also in public facilities, the wireless LAN (Local Area Network) technology, which is represented by the IEEE 802.11 standard, has been introduced. For example, there has been provided a video streaming service to audiences' portable information terminals such as smartphones in a stadium with the use of the wireless LAN technology. Such a service allows each audience to select any angle and watch video at the angle, which he/she cannot usually watch on TV.

However, it is assumed that there are an enormous number of terminals, and hence there is a concern that when a video streaming service as the one described above is to be provided with general one-to-one communication, the wireless resources are strained, with the result that high-resolution video cannot be streamed.

Further, it is conceivable to provide a video streaming service with the use of point-to-multipoint communication such as multicasting or broadcasting. To stream high-quality video, however, an error correction function or a retransmission function is also necessary. Setting such functions requires communication with streaming destinations, with the result that the wireless resources are strained.

For example, there have been known frame aggregation (multiplexing) that increases communication speed and a Block Ack system that consolidates Ack frames with respect to a plurality of MAC (Media Access Control) frames to enhance transmission efficiency (for example, see PTL 1). However, when this type of data exchange system is used, it is necessary to perform a sequence for predetermined transmitter-receiver settings as many times as the number of terminals that are video streaming destinations, and the wireless resources are thus strained.

CITATION LIST

Patent Literature

[PTL 1]
Japanese Patent Laid-open No. 2012-19459

SUMMARY

Technical Problem

It is an object of the technology disclosed herein to provide a communication apparatus and a communication method that enable ACK/NACK (ACKnowledgement/Negative-ACKnowledgement) transmission without complicated connection settings, to thereby realize high-efficiency and high-quality multicast communication.

Solution to Problem

The technology disclosed herein has been made in view of the above-mentioned problem, and according to a first aspect thereof, there is provided a communication apparatus including:

a communication unit configured to transmit and receive a signal; and a control unit configured to control the transmission and reception of the signal, in which the control unit controls transmission of an induction signal to one or more destination stations to each of which a signal has been transmitted, the induction signal inducing transmission of an acknowledgement/negative-acknowledgement signal with respect to the transmitted signal.

Specifically, the communication apparatus according to the above-mentioned first aspect operates as a base station to transmit a multicast signal to a plurality of terminal stations under an influence of the base station, and to transmit the induction signal for inducing transmission of an acknowledgement/negative-acknowledgement signal with respect to the multicast signal.

Further, according to a second aspect of the technology disclosed herein, there is provided a communication method including:

a step of transmitting a signal to a destination station; and a step of transmitting an induction signal to the destination station, the induction signal inducing transmission of an acknowledgement/negative-acknowledgement signal with respect to the signal.

Further, according to a third aspect of the technology disclosed herein, there is provided a communication apparatus, including:

a communication unit configured to transmit and receive a signal; and a control unit configured to control the transmission and reception of the signal, in which the control unit controls transmission of an acknowledgement/negative-acknowledgement signal in response to reception of an induction signal for inducing the transmission of the acknowledgement/negative-acknowledgement signal.

Specifically, the communication apparatus according to the above-mentioned third aspect operates as a terminal connected to a base station, and transmits, in response to reception of the induction signal from the base station, an acknowledgement/negative-acknowledgement signal with respect to a multicast signal transmitted from the base station.

Further, according to a fourth aspect of the technology disclosed herein, there is provided a communication method including:

a step of receiving a signal; and a step of transmitting an acknowledgement/negative-acknowledgement signal with respect to the signal in response to reception of an induction signal for inducing the transmission of the acknowledgement/negative-acknowledgement signal.

Advantageous Effects of Invention

According to the technology disclosed herein, it is possible to provide the communication apparatus and the communication method that enable ACK/NACK transmission without complicated connection settings, to thereby realize high-efficiency and high-quality multicast communication.

Note that, the effects described herein are merely exemplary, and the effects of the present invention are not limited thereto. Further, in some cases, the present invention may also exhibit additional effects other than the effects described above.

Other objects, features, and advantages of the technology disclosed herein will be clarified by a more detailed description based on embodiments described later and the attached drawings.

DESCRIPTION OF EMBODIMENTS

Now, embodiments of the technology disclosed herein are described in detail with reference to the drawings.

There has been provided a video streaming service to audiences' portable information terminals in a stadium or the like with the use of the wireless LAN technology such as IEEE 802.11. However, it is assumed that there are an enormous number of terminals, and hence there is a concern that when a video streaming service is to be provided with general one-to-one communication, the wireless resources are strained, with the result that high-resolution video cannot be streamed.

Further, it is conceivable to provide a video streaming service with the use of point-to-multipoint communication such as multicasting or broadcasting. To stream high-quality video, however, an error correction function or a retransmission function is also necessary. Setting such functions requires communication with streaming destinations, with the result that the wireless resources are strained.

Figure 8:
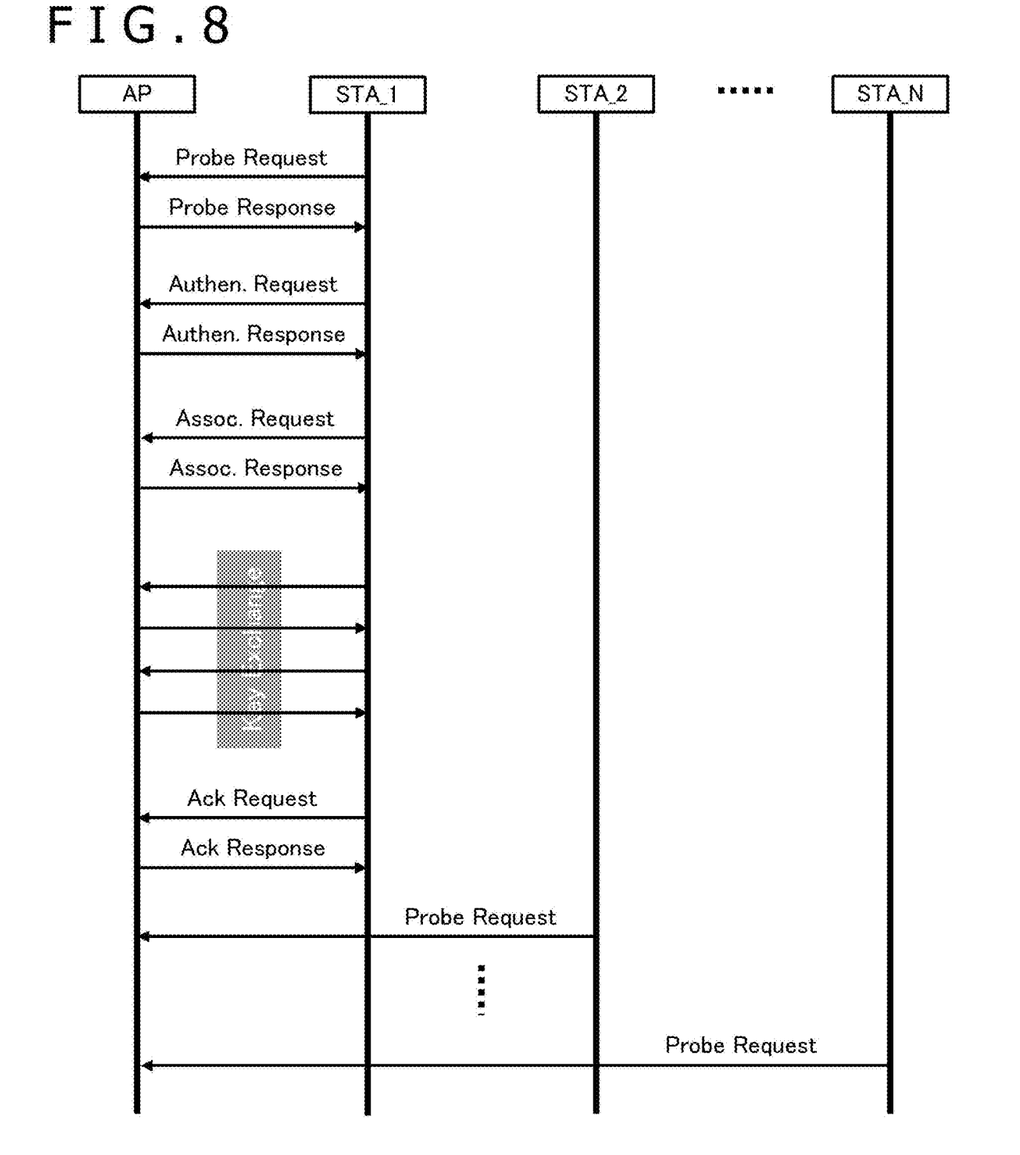
FIG. 8 is a diagram illustrating an example of a series of packet exchange sequence from the connection of terminals to a base station to the establishment of one-to-one communication.

FIG. 8 illustrates an example of a series of packet exchange sequence from the connection of terminals (STAtion: STA) to a base station (Access Point: AP) to the establishment of one-to-one communication.

First, a STA_1 transmits a Probe Request to the AP determined as a connection destination of the STA_1, to thereby inquire whether the AP has the same ESS (Extended Service Set)-ID as the one set to the STA_1. In response to this, the AP sends back a Probe Response when the ESS-IDs are the same. Note that, this procedure can be omitted when the STA_1 receives a beacon from the AP.

After that, the STA_1 transmits an Authentication Request to the AP, and in response to this, the AP sends back an Authentication Response. Subsequently, the STA_1 transmits an Association Request to the AP, and in response to this, the AP sends back an Association Response. Then, a procedure for Key Exchange between the AP and the STA_1 is performed, and data communication between the AP and the STA_1 is consequently enabled.

For example, to also establish links between the AP installed in a stadium and other terminals STA_2, . . . , and STA_N in the stadium, it is necessary to repeatedly perform a communication sequence similar to the one described above for the respective terminals.

To enable ACK/NACK (ACKnowledgement/Negative-ACKnowledgement) (Ack) transmission between the AP and the STA_1, the STA_1 further transmits an Ack Request, and the AP sends back an Ack Response in a case where the AP responds to this.

Further, also in a case where GCR (GroupCast with Retry) necessary for high-quality video reception is set, it is necessary to perform a communication sequence substantially similar to the one described above (GCR is a mechanism employed in IEEE 802.11aa, which enables ACK/NACK transmission with respect to multicast communication). In addition, to transmit block ACK/NACK (Block ACK) with respect to a plurality of frames, it is necessary to exchange an ADDBA (Add Block Ack) Request frame that requests a receiver for negotiation and an ADDBA Response frame that the receiver sends back, to thereby perform negotiation between the transmitter and the receiver in advance regarding communication quality settings such as a modulation method and a transmission rate. When GCR described above is used, a sequence for GCR settings is also necessary.

In this way, even connection settings with one terminal requires the complicated communication as described above. When an AP installed in a stadium is to stream high-quality video to an enormous number of terminals in the stadium, only communication related to connection settings may possibly use all the wireless resources.

Accordingly, what is described herein below is a technology that enables, without complicated connection settings between an AP and STAs (in other words, without the waste of wireless resources for connection settings), the STAs to transmit ACK/NACK, to thereby realize high-quality multicast communication.

Note that, the technology disclosed herein is applicable to both multicast communication and broadcast communication. It is to be understood that, in the following description, only "multicast communication" is used as a matter of convenience, but the description can be grasped by replacing "multicast communication" by "broadcast communication."

Figure 1:
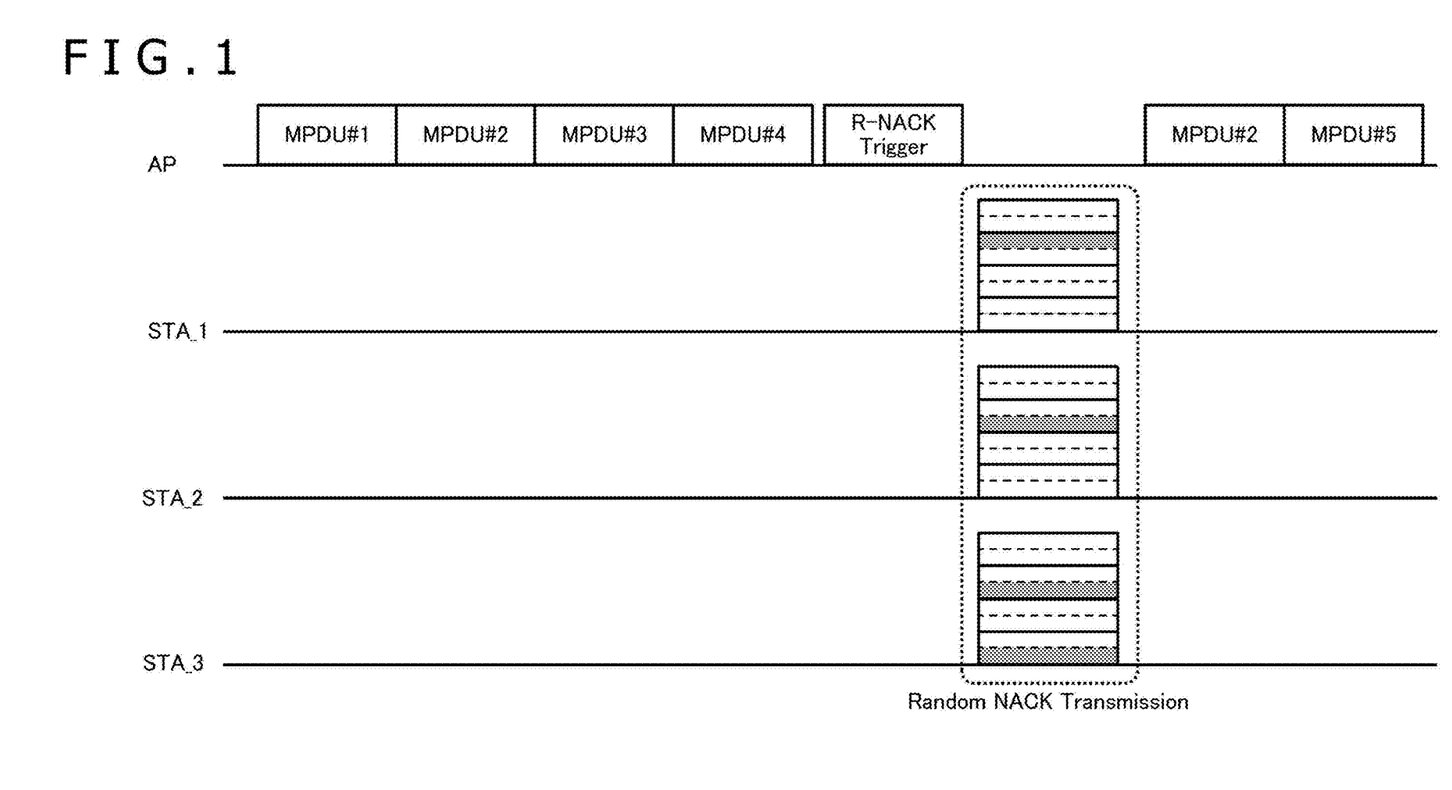
FIG. 1 is a diagram illustrating an example of a multicast communication sequence that enables ACK/NACK transmission from terminals.

FIG. 1 illustrates an example of a multicast communication sequence that enables ACK/NACK transmission from terminals to which the technology disclosed herein is applied. Note that, the horizontal axis of the communication sequence in the figure is the time axis.

The communication sequence in FIG. 1 is an example in which a certain AP transmits frames such as video data to three terminals STA_1, STA_2, and STA_3 in its communication range (or signal coverage) by multicasting. It is to be understood that, to simplify the figure, the AP communicates with the three terminals by multicasting, but also in a case where the AP communicates with four or more terminals by multicasting, similar operation is applicable. Further, it is to be understood that also in a case where the AP is installed in a stadium and communicates with an enormous number of terminals in the stadium by multicasting, a communication sequence similar to the one in FIG. 1 is applicable.

Each multicast frame that the AP transmits is an MPDU (MAC Protocol Data Unit). Further, a plurality of MPDUs #1 to #4 that the AP continuously transmits by multicasting forms a joined A-MPDU (Aggregation MPDU) including a MAC header. Thus, the terminals STA_1, STA_2, and STA_3 can each individually transmit ACK/NACK with respect to each of the plurality of MPDUs #1 to #4 transmitted by multicasting. Note that, it is also assumed that these MPDUs #1 to #4 are encrypted with the use of a key provided from the AP to each of the terminals STA_1, STA_2, and STA_3 in advance (this similarly applies hereinafter).

The terminals STA_1, STA_2, and STA_3 each detect the success or failure of the reception of each frame transmitted from the AP by multicasting, and store the detection results one after another.

Then, after transmitting a certain number of MPDUs, at an appropriate timing, the AP transmits, to each of the terminals STA_1, STA_2, and STA_3, a trigger frame for inducing ACK/NACK signal transmission.

Although the details of the trigger frame that is transmitted here are described later, the trigger frame indicates a plurality of candidate regions in which ACK/NACK signals are transmittable, and a terminal that has received the trigger frame can randomly select a candidate region to transmit an ACK/NACK signal. Such a trigger frame is herein also called "random trigger frame (Random NACK Trigger (R-NACK Trigger))." Note that, the trigger frame itself is defined by IEEE 802.11ax as a frame that allows uplink channel access.

Each of the terminals STA_1, STA_2, and STA_3 that has received the trigger frame (R-NACK trigger) transmits, on the basis of information described in the trigger frame, an ACK/NACK (NACK) signal indicating an MPDU failed to be received after a predetermined time from the reception of the trigger frame.

In the communication sequence example illustrated in FIG. 1, the trigger frame indicates that the four MPDUs #1 to #4 transmitted by multicasting are ACK/NACK targets. Further, although the details of the trigger frame are described later, the trigger frame has described therein information for setting frequency domains assigned for the transmission of ACK/NACK signals with respect to MPDUs that are ACK/NACK targets (per-MPDU NACK regions) and candidate regions for ACK/NACK signal transmission that are provided in each per-MPDU NACK region, for example.

Each of the terminals STA_1, STA_2, and STA_3 transmits, by being induced by the trigger frame, the ACK/NACK signal using one candidate region randomly selected from a per-MPDU NACK region corresponding to the MPDU detected as being unreceivable, to thereby notify the AP of the MPDU failed to be received.

In the communication sequence example illustrated in FIG. 1, the STA_1 has detected the failure of the reception of the MPDU #2 of the MPDUs #1 to #4 transmitted by multicasting, and hence the STA_1 is induced by the trigger frame to transmit an ACK/NACK signal in an MPDU #2 NACK region assigned to ACK/NACK with respect to the MPDU #2. In a similar manner, the STA_2 has detected the failure of the reception of the MPDU #2, and hence the STA_2 is induced by the trigger frame to transmit an ACK/NACK signal in the MPDU #2 NACK region assigned to ACK/NACK with respect to the MPDU #2. In a similar manner, the STA_3 has detected the failure of the reception of the MPDUs #2 and #4, and hence the STA_3 is induced by the trigger frame to transmit ACK/NACK signals in MPDU #2 NACK region and MPDU #4 NACK region assigned to ACK/NACK with respect to the respective MPDUs #2 and #4.

The AP can recognize, as an MPDU that some of the terminals that are the transmission destinations have failed to receive, an MPDU corresponding to an individual per-MPDU NACK region in which ACK/NACK signals have been detected in the entire frequency domain assigned to ACK/NACK signal transmission with respect to the plurality of MPDUs as the targets of reception confirmation. The AP can determine the necessity of retransmission in this way. In the communication sequence example illustrated in FIG. 1, the AP can recognize that some of the terminals have failed to receive the MPDU #2 and the MPDU #4, and that a greater number of terminals have failed to receive the MPDU #2 and the MPDU #2 thus has a higher retransmission priority. Then, the AP retransmits the MPDU #2 having higher priority, thereby being capable of ensuring the quality of communication with each terminal.

Note that, ACK/NACK signals that each terminal transmits are radio signals transmitted with transmission electric power having a predetermined value or more in a frequency domain assigned to each target MPDU (per-MPDU NACK region), and are not required to have specific data superimposed thereon. Further, the AP determines, only on the basis of whether the AP has successfully detected reception electric power (energy) having a predetermined value or more in a frequency domain assigned to a per-MPDU NACK region, whether the AP has received an ACK/NACK signal with respect to the corresponding MPDU. Thus, the AP can determine, only with a reception signal strength in a per-MPDU NACK region, whether to retransmit the corresponding MPDU, and is not required to demodulate and decode the reception signal.

In the present embodiment, a frequency size that is used for one ACK/NACK signal (Individual Signal Size) is set to one N-th of a frequency size that is assigned to a per-MPDU NACK region (note that, N is an integer of 2 or more), and a plurality of (N) candidate regions is provided in each per-MPDU NACK region. The terminal randomly selects one of the N candidate regions in a per-MPDU NACK region corresponding to an MPDU failed to be received, and sends back an ACK/NACK signal to the AP. ACK/NACK signal transmission using a randomly selected candidate region is herein also referred to as "Random NACK Transmission." The AP simultaneously receives, with respect to one MPDU, ACK/NACK signals in at most N candidate regions through Random NACK Transmission, thereby being capable of grasping that at least N terminals have failed to receive the MPDU. Note that, in a case where more than N terminals simultaneously transmit ACK/NACK signals or a case where two or more terminals select the same candidate region to transmit ACK/NACK signals, the AP cannot accurately grasp the number of terminals from the number of candidate regions for the ACK/NACK signals received in the per-MPDU NACK region.

The AP can recognize, on the basis of the number of candidate regions in a per-MPDU NACK region in which ACK/NACK signals have been received, the number of terminals that have failed to receive the corresponding MPDU, and control MPDU retransmission on the basis of the number of terminals. For example, in a case where time resources usable in retransmission are limited, the AP gives high priority to the retransmission of an MPDU to which more terminals have sent back ACK/NACK signals.

In the communication sequence example illustrated in FIG. 1, N=2, that is, two candidate regions are provided in each per-MPDU NACK region. Moreover, the ACK/NACK signals have been sent back with respect to each of the MPDUs #2 and #4. While the three terminals STA_1, STA_2, and STA_3 have sent back the ACK/NACK signals with respect to the MPDU #2, only one terminal STA_3 has sent back the ACK/NACK signal with respect to the MPDU #4. Since the AP receives the ACK/NACK signals in the two candidate regions with respect to the MPDU #2, the AP can determine that at least two terminals have failed to receive the MPDU #2. Further, since the AP receives the ACK/NACK signal only in one candidate region with respect to the MPDU #4, the AP can determine that at least one terminal has failed to receive the MPDU #4. Thus, the AP determines that the MPDU with respect to which more ACK/NACK signals have been received has a higher retransmission priority, and retransmits only the MPDU #2 having higher retransmission priority at a next transmission timing.

Here, when the number of candidate regions provided in each per-MPDU NACK region is small as compared to the number of terminals under the influence of the AP, it is highly possible that, with respect to an MPDU that many terminals have failed to receive, a plurality of terminals randomly selects the same candidate region to transmit ACK/NACK signals. In such a circumstance, even though it is possible to determine an MPDU that a terminal or terminals have failed to receive (in other words, an MPDU to be retransmitted), it is difficult to grasp the number of terminals that have failed to receive the MPDU. This results in a concern that the retransmission priority of a plurality of MPDUs with respect to which ACK/NACK signals have been sent back cannot be accurately determined. In this case, it is sufficient that the Individual Signal Size is reduced and the number N of candidate regions provided in each per-MPDU NACK region is increased, so that the terminals under the influence of the AP do not select the same candidate region in an overlapping manner.

Figure 2:
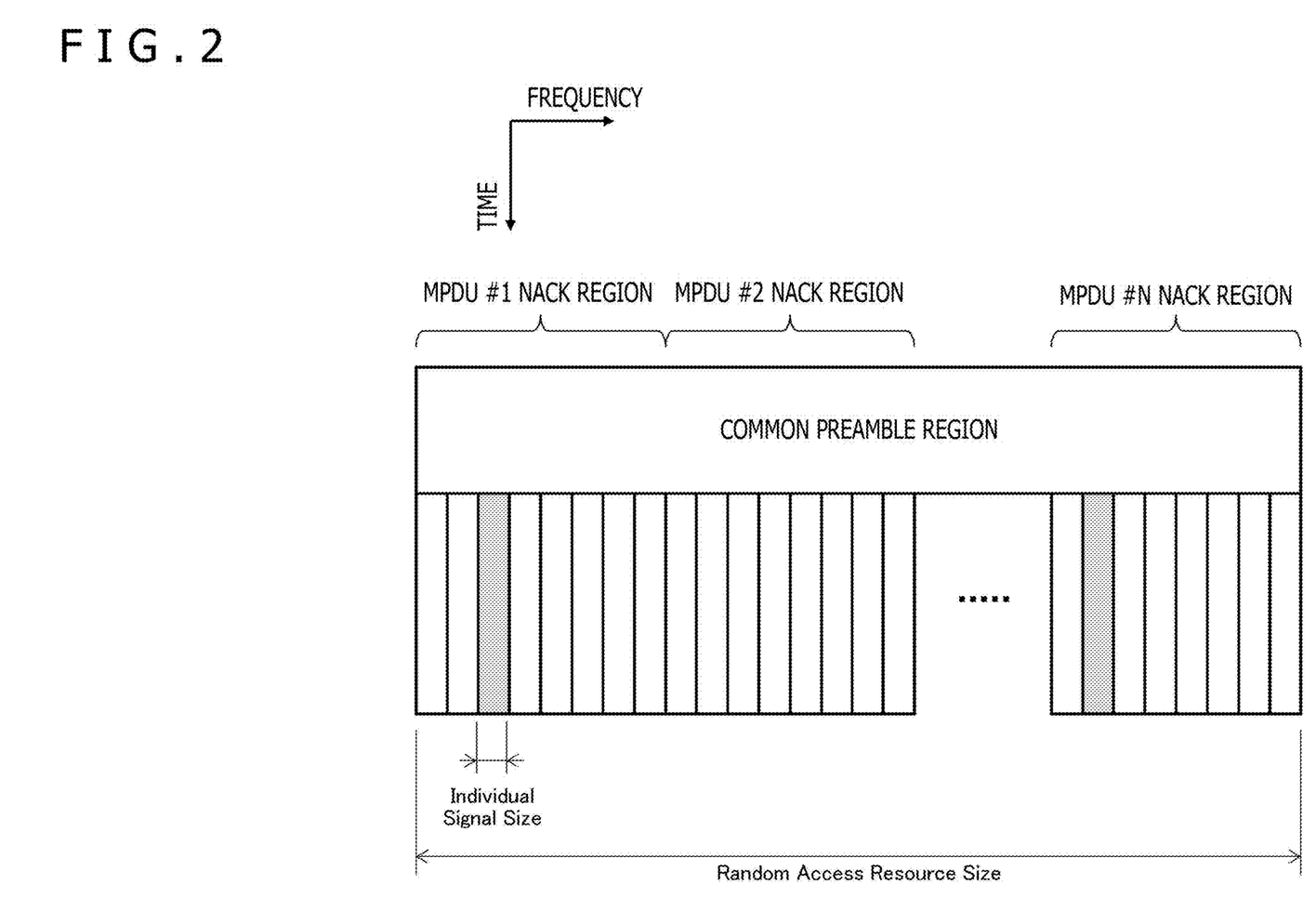
FIG. 2 is a diagram illustrating a configuration example of a frame for transmitting an ACK/NACK signal.

FIG. 2 illustrates a configuration example of a frame for a terminal that is an MPDU transmission destination to transmit an ACK/NACK signal to the AP. Note that, in the figure, the horizontal axis is the time axis and the vertical axis is the frequency axis. This frame includes a signal in which a common preamble region is joined, in the time direction, to an ACK/NACK signal put in one candidate region selected from a per-MPDU NACK region assigned to each MPDU that the terminal has failed to receive.

As illustrated in the figure, first, an entire usable frequency domain is set in the common preamble region, and preamble transmission is performed. This is for a legacy measurement in an IEEE 802.11 system and similar to a Triggered PPDU (PLCP (Physical Layer Convergence Protocol) Protocol Data Unit) defined by IEEE 802.11ax.

Then, after performing preamble transmission, the terminal selects a region having one Individual Signal Size that is a small frequency size, and transmits an ACK/NACK signal. Specifically, the entire frequency domain usable in ACK/NACK signal transmission (Random Access Resource Size) is divided by the number of MPDUs that are ACK/NACK targets, so that per-MPDU NACK regions assigned to ACK/NACK signal transmission per MPDU are provided. In the example illustrated, N MPDUs #1 to #N continuously transmitted by multicasting are ACK/NACK targets, and the entire frequency domain is divided into N per-MPDU NACK regions (MPDU #1 NACK region, MPDU #2 NACK region, . . . , and MPDU #N NACK region).

Each per-MPDU NACK region is divided into a plurality of small candidate regions by the Individual Signal Size that is a smaller frequency size. The Individual Signal Size corresponds to a frequency width that one ACK/NACK signal uses. When the terminal has failed to receive any of a plurality of MPDUs continuously transmitted, the terminal joins, after the common preamble region, an ACK/NACK signal (electric power) to one candidate region selected from a per-MPDU NACK region assigned to the MPDU failed to be received, and transmits the frame (FIG. 2 illustrates an example in which in a case where the terminal has failed to receive the MPDU #1, . . . , and the MPDU #N, ACK/NACK signals (electric power) are put in candidate regions (gray areas) randomly selected from the corresponding per-MPDU NACK regions). Thus, in one per-MPDU NACK region, as many terminals as the number of divisions of the per-MPDU NACK region based on the Individual Signal Size can simultaneously transmit ACK/NACK signals without overlapping (individually).

When a terminal that is a transmission destination of an A-MPDU transmitted from the AP by multicasting detects that any of MPDUs has been failed to be received, the terminal randomly selects, from a per-MPDU NACK region corresponding to the MPDU, a candidate region having one Individual Signal Size, and transmits an ACK/NACK signal using the candidate region (Random NACK Transmission).

ACK/NACK signals that each terminal transmits are radio signals transmitted with transmission electric power having a predetermined value or more in the corresponding per-MPDU NACK region, and are not required to have specific data superimposed thereon. Further, the AP determines, only on the basis of whether or not the AP has successfully detected reception electric power (energy) having a predetermined value or more in a frequency domain assigned to each MPDU (per-MPDU NACK region), the success or failure of the reception of an ACK/NACK signal with respect to the corresponding MPDU. Thus, the AP can determine, only with a reception signal strength in a per-MPDU NACK region, whether or not to retransmit the corresponding MPDU, and is not required to demodulate and decode the reception signal.

Note that, in the signal format example illustrated in FIG. 2, the plurality of per-MPDU NACK regions is multiplexed in the frequency axis direction, but a signal format in which per-MPDU NACK regions are multiplexed in the time axis direction is also conceivable.

Figure 3:
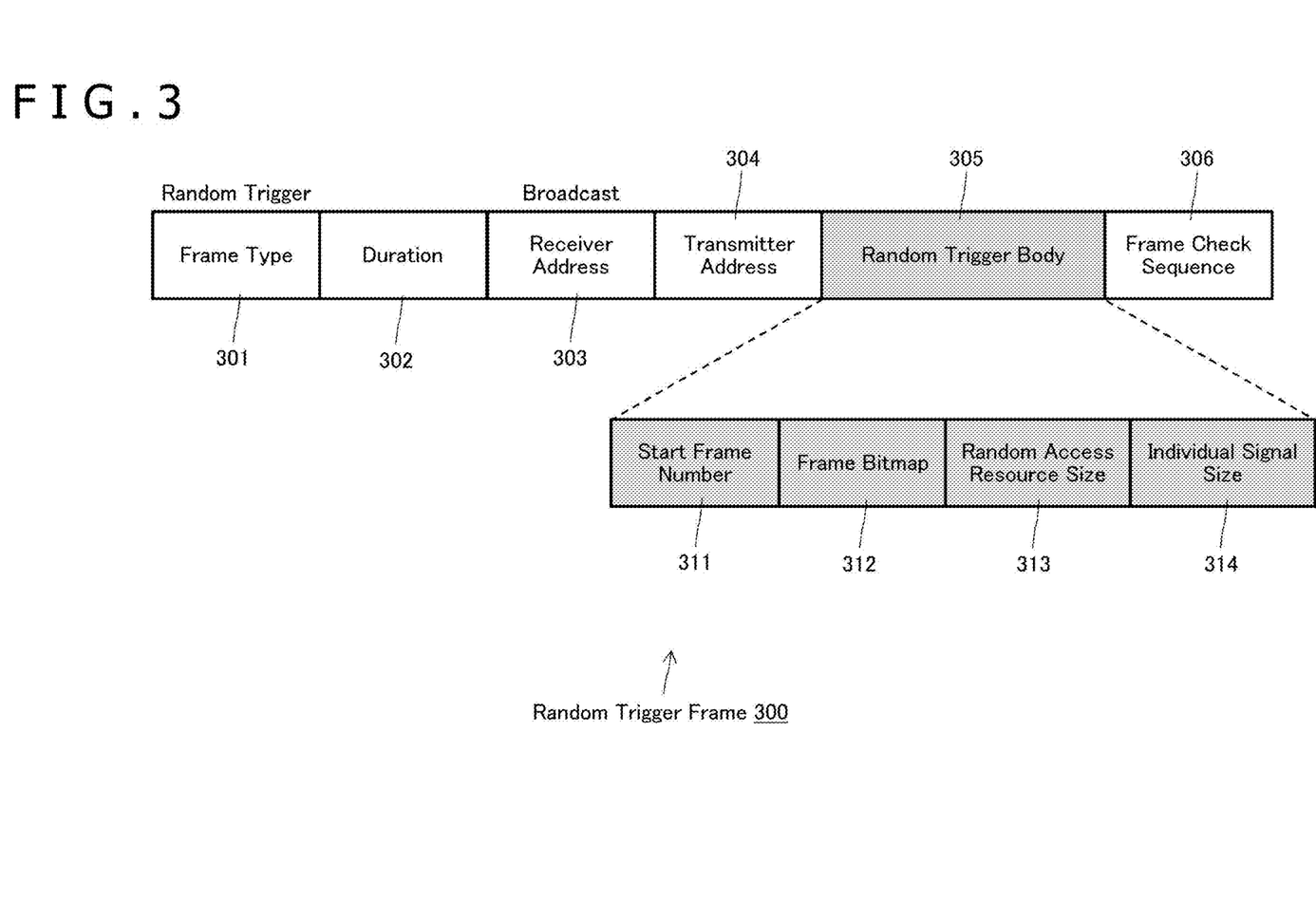
FIG. 3 is a diagram illustrating a configuration example of a trigger frame for inducing ACK/NACK signal transmission (Random NACK Trigger).

FIG. 3 illustrates a configuration example of a trigger frame 300 for inducing ACK/NACK signal transmission. Note that, in the figure, only a payload (MAC) portion is illustrated, and the illustration of a Phy Header portion is omitted. The trigger frame 300 is a random trigger frame for inducing a terminal to transmit an ACK/NACK signal using a randomly selected region (Random NACK Transmission) (Random NACK Trigger (R-NACK Trigger)). When performing multicast frame retransmission control, the AP transmits the trigger frame 300 in the figure to each terminal that is a transmission destination.

In a Frame Type field 301 that is the first field of the trigger frame 300, a value indicating that the trigger frame 300 is a random trigger frame is described. In a Duration field 302 that is a subsequent field, a value indicating time to be set to a NAV (Network Allocation Vector: transmission prohibition period) is described. In the case of the communication sequence example illustrated in FIG. 1, a value indicating time taken for a terminal to complete ACK/NACK signal transmission (Random NACK Transmission) is described in the Duration field. Terminals around the AP that have received the trigger frame 300 suppress transmission operation for a period specified by the NAV.

In a Receiver Address field 303, the address (MAC address) of a terminal that is the destination of the trigger frame 300 is described. A terminal that is specified as the destination of the trigger frame can also be called a terminal requested to transmit ACK/NACK. A broadcast address may be described in the Receiver Address field 303. Further, in a Transmitter Address field 304, the address (MAC address) of the AP, which is the transmission source of the trigger frame 300, is described.

A Random NACK Trigger Body field 305 corresponds to the frame body of the trigger frame 300. In the Random NACK Trigger Body field 305, information for giving instructions regarding ACK/NACK signal transmission (Random NACK Transmission) to a terminal specified as a destination by the Receiver Address field 303 is described. Moreover, in the end of the trigger frame 300, a frame check sequence (FCS) 306 for detecting and correcting errors in data contents described in the trigger frame 300 is added.

In the frame configuration example illustrated in FIG. 3, in the Random NACK Trigger Body field 305, a Start Frame Number field, a Frame Bitmap field, a Random Access Resource Size field, and an Individual Signal Size field, which are denoted by reference numerals 311, 312, 313, and 314, respectively, are provided.

In the Start Frame Number field 311, the first sequence number of a group of MPDUs that are ACK/NACK targets (A-MPDU transmitted by the AP by multicasting) is described. In the Frame Bitmap field 312, which is a subsequent field, there is described a bitmap indicating, in order from the first MPDU specified by the Start Frame Number, the sequence numbers of the ACK/NACK target MPDUs (specifically, the relative positions of the MPDUs, which form the ACK/NACK target group, from the first MPDU).

For example, in a case where sequence numbers 3, 4, 6, and 7 of an A-MPDU transmitted by multicasting are ACK/NACK targets, the first sequence number 3 is described in the Start Frame Number field 311. Further, in the Frame Bitmap field 312, there is described a 5-bit bitmap "11011" indicating that, of the five successive sequence numbers 3 to 7, the first, second, fourth, and fifth MPDUs are targets, whereas the third MPDU is not a target.

Bit positions with the Start Frame Number field 311 indicating the first MPDU of the ACK/NACK target MPDUs and the Frame Bitmap field 312 indicating "1" indicate the relative positions of the ACK/NACK target MPDUs from the first MPDU. Further, the total number of bits having "1" in the Frame Bitmap field 312 indicates the total number of MPDUs that are ACK/NACK targets.

In the Random Access Resource Size field 313, the size of an entire frequency domain usable in ACK/NACK signal transmission is described. Further, in the Individual Signal Size field 314, the size of each candidate region usable in ACK/NACK signal transmission is described. "Size" used herein is a size on the frequency axis and is indicated by the number of subcarriers, for example. Also in FIG. 2 described above, the Random Access Resource Size and the Individual Signal Size are illustrated.

A terminal that has received the trigger frame 300 (note that, the terminal is specified by the Receiver Address) divides the Random Access Resource Size by the number of MPDUs that are ACK/NACK targets, to thereby provide per-MPDU NACK regions for transmitting ACK/NACK signals with respect to the respective MPDUs. Note that, the number of MPDUs that are ACK/NACK targets is the total number of bits having "1" in the Frame Bitmap field (as described above).

Then, the terminal in question further divides each per-MPDU NACK region by the Individual Signal Size, thereby being capable of securing a plurality of candidate regions for ACK/NACK signal transmission. When transmitting ACK/NACK with respect to a certain MPDU, the terminal can randomly select any one of the plurality of candidate regions from the corresponding per-MPDU NACK region, and transmit an ACK/NACK signal using the selected candidate region.

For example, in a case where the Random Access Resource Size is 20 MHz and the Frame Bitmap is 11011, the Random Access Resource Size, which is 20 MHz, is divided by 4 corresponding to the number of MPDUs that are ACK/NACK targets, and a frequency width of 5 MHz is assigned to each per-MPDU NACK region. In addition, in a case where the Individual Signal Size is 1 MHz, in each per-MPDU NACK region having 5 MHz, five candidate regions having a frequency width of 1 MHZ are provided.

Note that, the Individual Signal Size, which represents an ACK/NACK signal frequency size, can be appropriately adjusted. For example, the AP can describe an adjusted ACK/NACK signal frequency size in the Individual Signal Size field 314 in the Randon Trigger Body field 305 of the trigger frame described above, to thereby notify each terminal that is a multicast transmission destination of the adjusted ACK/NACK signal frequency size.

In a case where there is an upper limit for the Random Access Resource Size, as the number of MPDUs that are ACK/NACK targets is increased, a frequency size assigned to one per-MPDU NACK region is narrowed. Further, the frequency size of one ACK/NACK signal (Individual Signal Size) is determined depending on the number of terminals requested to transmit ACK/NACK (in other words, the number of terminals specified as trigger frame destinations).

As the Individual Signal Size is increased, the number of subcarriers used in signal transmission is increased and the electric power of one ACK/NACK signal is thus increased. This results in a higher detection sensitivity. However, since the number of candidate regions that can be provided in each per-MPDU NACK region is decreased as the Individual Signal Size is increased, a possibility that two or more terminals transmit ACK/NACK signals using the same candidate region. As a result, the AP cannot accurately grasp the number of terminals that have failed to receive MPDUs, and the accuracy of MPDU retransmission priority determination therefore drops.

Meanwhile, as the Individual Signal Size is reduced, more candidate regions can be provided in the same size per-MPDU NACK region. Individual terminals can randomly select different candidate regions to transmit ACK/NACK signals without overlapping. As a result, the granularity of retransmission priority determination is fine, and the AP can thus accurately grasp the number of terminals that have failed to receive MPDUs, and determine the retransmission priority of the MPDUs with high accuracy. Note that, the ACK/NACK signal detection sensitivity drops since the number of subcarriers used in ACK/NACK signal transmission is reduced and reception electric power is thus reduced.

Figure 4:
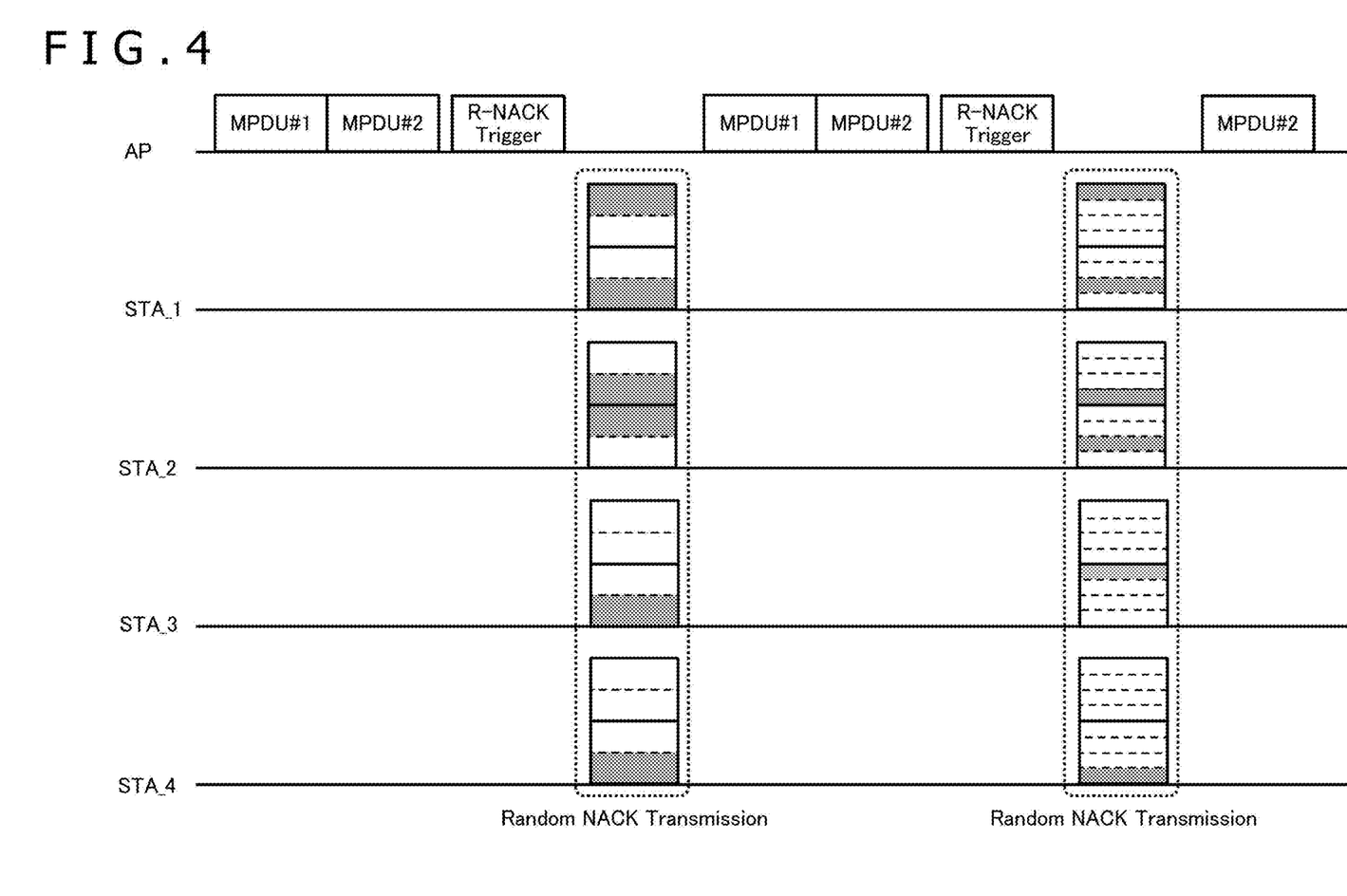
FIG. 4 is a diagram illustrating an example of a multicast communication sequence including ACK/NACK signal size adjustment.

FIG. 4 illustrates an example of a multicast communication sequence including ACK/NACK signal size adjustment.

Note that, the horizontal axis of the communication sequence in the figure is the time axis. In the middle of the communication sequence, the size of an ACK/NACK signal is switched.

The communication sequence in the figure is an example in which a certain AP transmits frames such as video data to four terminals STA_1, STA_2, STA_3, and STA_4 in its communication range (or signal coverage) by multicasting. It is to be understood that, to simplify the figure, the AP communicates with the four terminals by multicasting, but also in a case where the AP communicates with five or more terminals by multicasting, similar operation is applicable. Further, it is to be understood that also in a case where the AP is installed in a stadium and communicates with an enormous number of terminals in the stadium by multicasting, a communication sequence similar to the one in FIG. 4 is applicable.

Further, each multicast frame that the AP transmits is an MPDU, and a plurality of MPDUs that the AP continuously transmits by multicasting forms a joined A-MPDU including a MAC header. Thus, each of the terminals STA_1, STA_2, STA_3, and STA_4 can individually transmit ACK/NACK with respect to each of the plurality of frames transmitted by multicasting (as described above).

First, the AP transmits the two joined MPDUs #1 and #2 by multicasting. It is also assumed that these MPDUs are encrypted using a key provided from the AP to each of the terminals STA_1, STA_2, STA_3, and STA_4 in advance (this similarly applies hereinafter). The terminals STA_1, STA_2, STA_3, and STA_4 each detect the success or failure of the reception of each MPDU transmitted from the AP by multicasting, and store the detection results one after another.

Subsequently, the AP transmits, to each of the terminals STA_1, STA_2, STA_3, and STA_4, a first trigger frame for inducing ACK/NACK signal transmission (Random NACK Trigger). In response to this, the terminals STA_1, STA_2, STA_3, and STA_4 each transmit an ACK/NACK signal indicating an MPDU failed to be received using a candidate region randomly selected from a per-MPDU NACK region assigned to the corresponding MPDU.

In the first trigger frame, the AP specifies both of the two MPDUs #1 and #2 as ACK/NACK targets, and specifies an Individual Signal Size with which each per-MPDU NACK region is divided into two candidate regions. Further, neither the STA_1 nor the STA_2 has received the MPDU #1 and the MPDU #2, and the STA_3 and the STA_4 have both failed to receive only the MPDU #2. Specifically, while the two terminals have failed to receive the MPDU #1, no terminal has received the MPDU #2. However, the number of candidate regions from which the AP receives ACK/NACK signals is the same between the per-MPDU NACK regions, that is, two, and hence the MPDU #1 and the MPDU #2 have the same retransmission priority.

The AP retransmits, on the basis of the retransmission priority determination results, both of the two MPDUs #1 and #2 to each of the terminals STA_1, STA_2, STA_3, and STA_4.

Subsequently, the AP, the AP transmits a second trigger frame for inducing ACK/NACK signal transmission (Random NACK Trigger) to each of the terminals STA_1, STA_2, STA_3, and STA_4. Note that, since the AP has failed to determine the retransmission priority of the transmission frames with the ACK/NACK signals sent back from the respective terminals STA_1, STA_2, STA_3, and STA_4 induced by the first trigger frame, the AP specifies, in the second trigger frame, an Individual Signal Size half as large as the previous one. Thus, candidate regions twice as many as the previous one, that is, four candidate regions are provided in each per-MPDU NACK region.

It is assumed that, similar to the first multicast transmission, neither the STA_1 nor the STA_2 has received the MPDU #1 and the MPDU #2, and the STA_3 and the STA_4 have both failed to receive only the MPDU #2. The terminals STA_1, STA_2, STA_3, and STA_4 each transmit an ACK/NACK signal indicating the MPDU failed to be received using a candidate region randomly selected from the per-MPDU NACK region assigned to the corresponding MPDU.

Since the number of candidate regions in each per-MPDU NACK region is doubled, while the AP detects the ACK/NACK signals in two candidate regions from the MPDU #1 NACK region, the AP can detect the ACK/NACK signals in three candidate regions from the MPDU #2 NACK region. Thus, the AP accurately determines that the MPDU #2 has a higher retransmission priority than the MPDU #1 has, and retransmits only the MPDU #2 at a subsequent transmission timing. Specifically, the AP can increase the efficiency of frame retransmission processing, to thereby realize high-efficiency and high-quality multicast communication.

Note that, in the embodiment described above, a terminal transmits an ACK/NACK signal corresponding to NACK in a case where the terminal has failed to receive a frame from the AP. A configuration in which, in contrast to this, a terminal transmits an ACK/NACK signal corresponding to ACK in a case where the terminal has successfully received a frame can also realize high-quality multicast communication.

Figure 5:
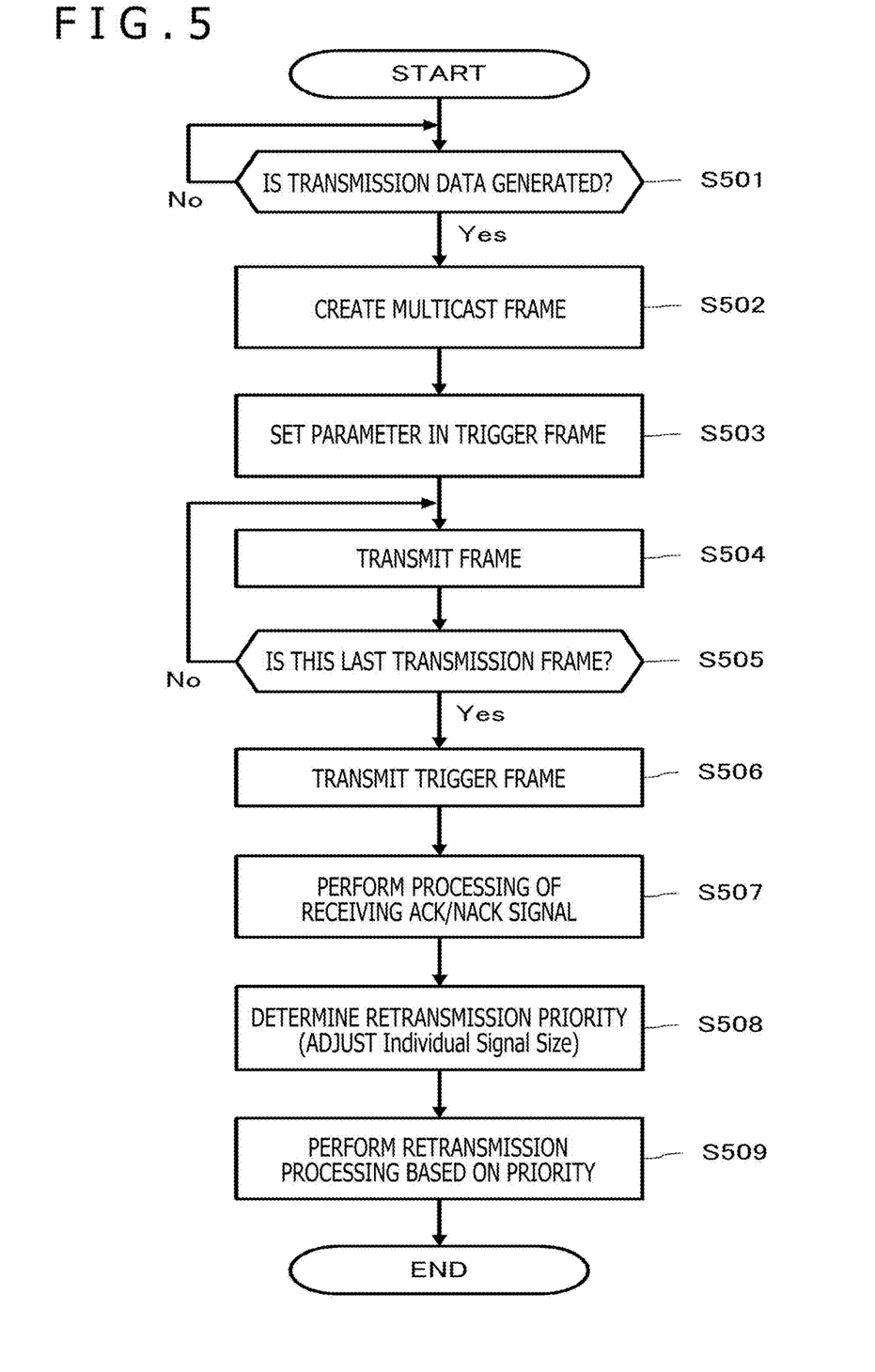
FIG. 5 is a flowchart illustrating an example of a processing procedure for a communication apparatus configured to operate as an AP to perform multicast communication while controlling terminals to transmit ACK/NACK.

FIG. 5 illustrates a flowchart of an example of a processing procedure for a communication apparatus configured to operate as an AP to perform multicast communication while controlling terminals to transmit ACK/NACK according to the technology disclosed herein.

When transmission data (for example, video data) to be sent to a plurality of terminals by multicasting is generated in an upper layer (Yes in Step S501), the AP creates a multicast frame for transmitting the transmission data (Step S502). The multicast frame is, for example, an A-MPDU in which a plurality of MPDUs is joined.

Next, the AP sets, to each terminal that is a multicast frame transmission destination, each parameter in a trigger frame for inducing ACK/NACK signal transmission (Step S503). What are set in this processing step are parameters for identifying each of the ACK/NACK target MPDUs of a multicast frame (Start Frame Number and Frame Bitmap), and parameters such as information associated with a frequency domain usable in ACK/NACK signal transmission with respect to each MPDU (Random Access Resource Size) and information associated with the size of candidate regions randomly selected for ACK/NACK signal transmission (Individual Signal Size).

Then, the AP sequentially transmits a plurality of multicast frames (Step S504). Here, it is assumed that the plurality of MPDUs is joined to be transmitted with the A-MPDU scheme.

When the AP finishes the multicast transmission of all the MPDUs (Yes in Step S505), the AP transmits the trigger frame including each parameter set in Step S503 by multicasting (Step S506).

After that, the AP performs the processing of receiving an ACK/NACK signal from each terminal that is the multicast frame transmission destination (Step S507).

Then, the AP determines, on the basis of the ACK/NACK signal reception result with respect to each target MPDU, the retransmission priority of each MPDU (step S508). Note that, in a case where it is estimated, on the basis of, for example, the fact that the retransmission priority of each MPDU cannot be clearly determined, that the ACK/NACK signals have been failed to be received with sufficient granularity, the AP reduces, by adjustment, an Individual Signal Size that is described in a trigger frame to be transmitted sequentially.

When a next transmission timing arrives, the AP performs the retransmission processing of a predetermined number of MPDUs in order of priority (Step S509). The details of the retransmission processing are similar to the ones in Step S502 to 506 described above.

Figure 6:
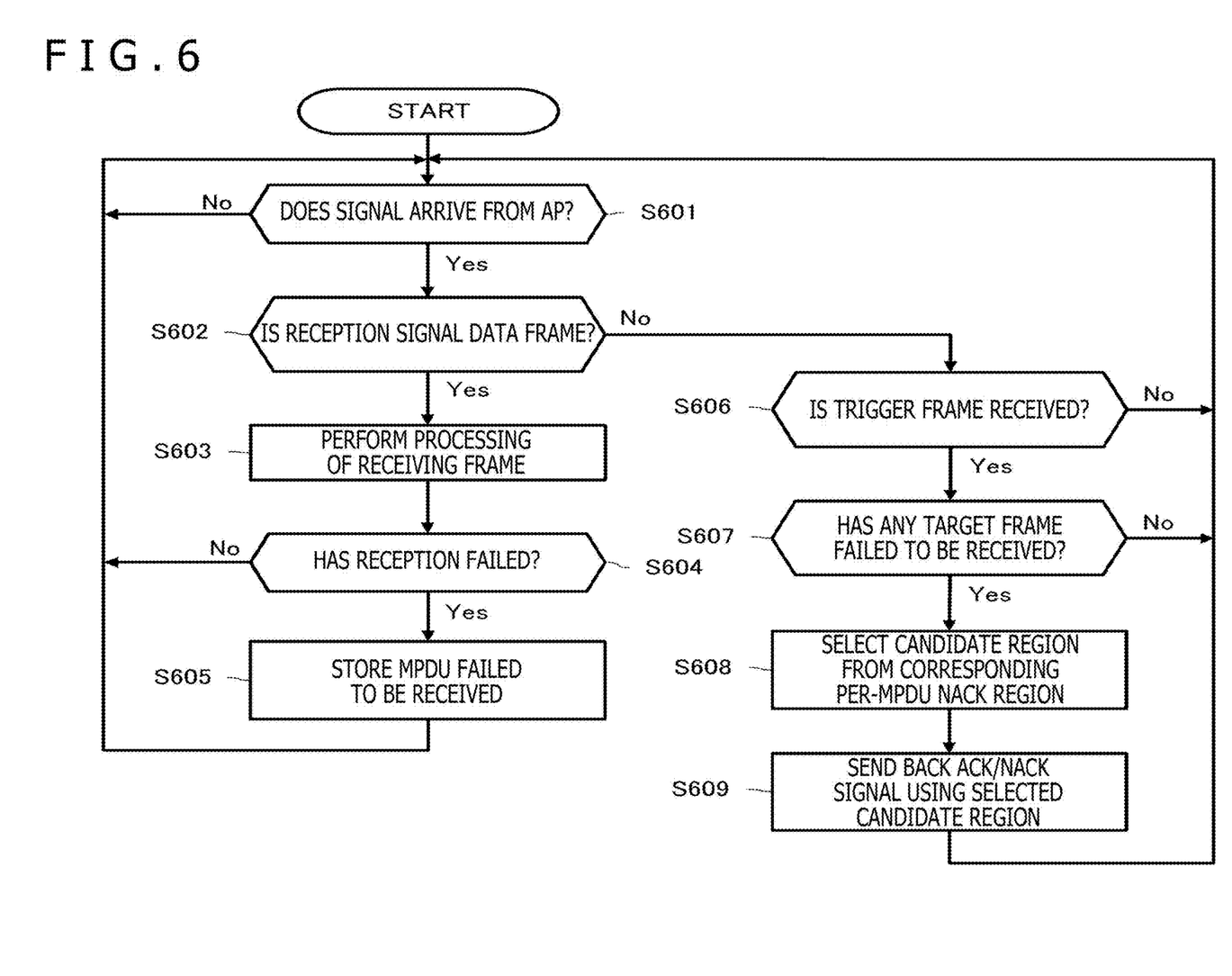
FIG. 6 is a flowchart illustrating an example of a processing procedure for a communication apparatus configured to operate as a terminal under the influence of an AP to receive a frame transmitted from the AP by multicasting and to transmit ACK/NACK.

FIG. 6 is a flowchart illustrating an example of a processing procedure for a communication apparatus configured to operate as a terminal under the influence of an AP to receive a frame transmitted from the AP by multicasting and to transmit ACK/NACK according to the technology disclosed herein.

The terminal waits until a signal arrives from the AP that is a connection destination (Step S601). Then, when the signal arrives from the AP (Yes in Step S601), the terminal further checks whether the reception signal is a data frame (Step S602).

Here, it is assumed that, from the AP, data frames having video data or the like are transmitted as a multicast frame based on the A-MPDU scheme. Further, the frame that arrives from the AP is limited to a data frame or a trigger frame for inducing ACK/NACK signal transmission, which is transmitted after the A-MPDU.

Then, in a case where data frames arrive from the AP (Yes in Step S602), the terminal performs the processing of receiving the frames (Step S603). Here, in a case where the terminal has successfully received the frames by the processing, the terminal sends, to an upper layer, the reception data subjected to demodulation and decoding.

Further, in a case where the terminal has failed to receive a data frame that has arrived from the AP (Yes in Step S604), the terminal stores the MPDU (Step S605). Then, the terminal returns to Step S601, and waits for a next arrival signal from the AP.

Meanwhile, in a case where the frame that has arrived from the AP is not a data frame (No in Step S602) but a trigger frame for inducing ACK/NACK signal transmission, which is transmitted after the A-MPDU (see FIG. 3) (Yes in Step S606), the terminal performs ACK/NACK signal transmission processing.

Specifically, the terminal checks, on the basis of the contents stored in Step S605, whether the terminal has successfully received each MPDU specified as an ACK/NACK target in the trigger frame (Step S607).

In a case where the terminal has successfully received all the ACK/NACK target MPDUs by the processing (No in Step S607), the terminal transmits no ACK/NACK signal to the AP. Then, the terminal returns to Step S601, and waits for a next arrival signal from the AP.

Further, in a case where the terminal has failed to receive some of the ACK/NACK target MPDUs (Yes in Step S607), with respect to each MPDU failed to be received, the terminal randomly selects one candidate region from the corresponding per-MPDU NACK region (Step S608), and transmits an ACK/NACK signal to the AP using the candidate region (Step S609). Then, the terminal returns to Step S601, and waits for a next arrival signal from the AP.

Figure 7:
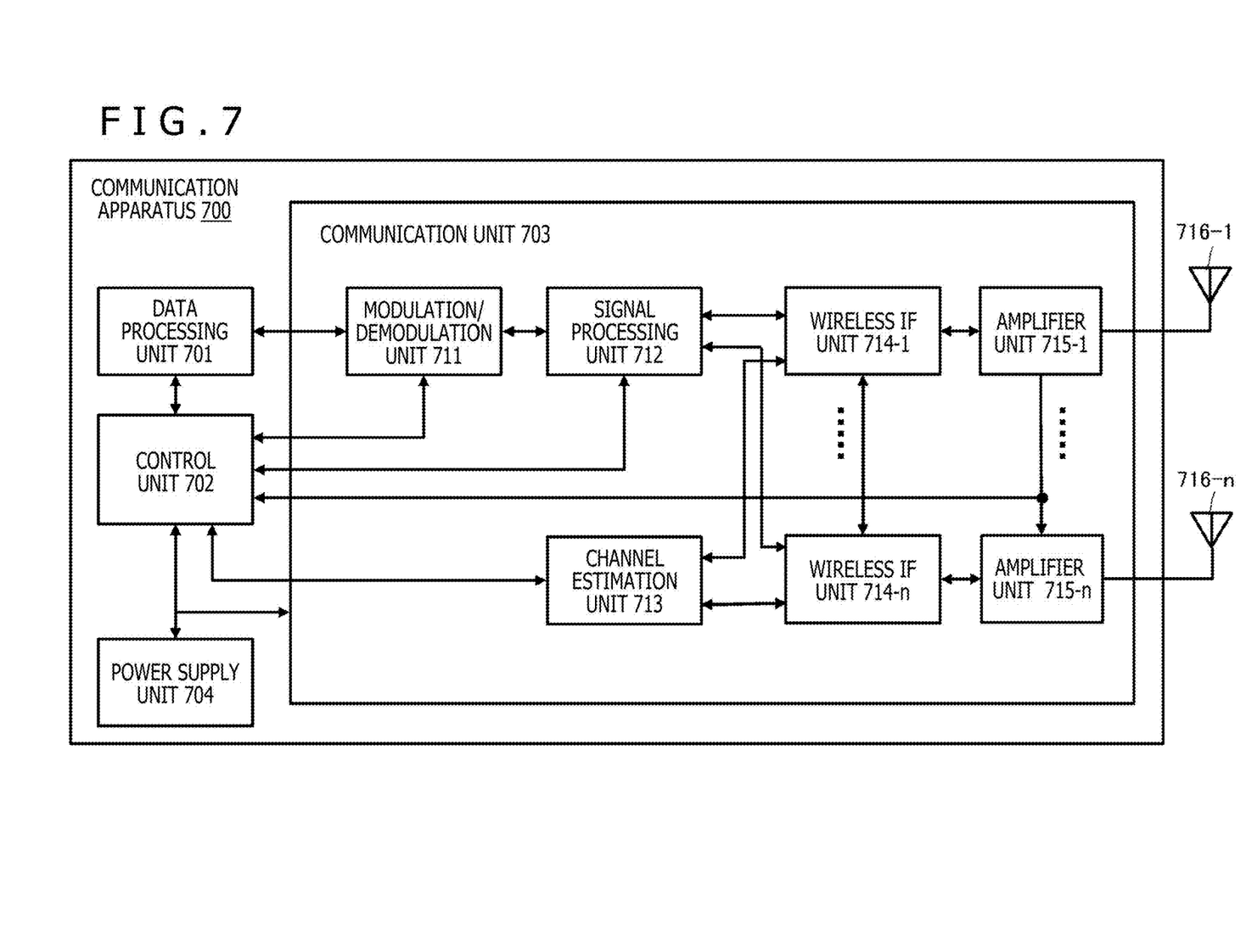
FIG. 7 is a diagram illustrating a configuration example of a communication apparatus 700.

FIG. 7 illustrates a configuration example of a communication apparatus 700 to which the technology disclosed herein is applicable. The communication apparatus 700 can operate as either the base station (AP) or the terminal (STA) in the communication sequence illustrated in FIG. 1 or FIG. 4, for example.

The communication apparatus 700 includes a data processing unit 701, a control unit 702, a communication unit 703, and a power supply unit 704. Further, the communication unit 703 includes a modulation/demodulation unit 711, a signal processing unit 712, a channel estimation unit 713, a wireless interface (IF) unit 714, and an amplifier unit 715. To the amplifier unit 715, an antenna 716 is connected. Note that, the wireless interface unit 714, the amplifier unit 715, and the antenna 716 may be regarded as one set, and one or more sets may serve as components. Further, the wireless interface unit 714 has the function of the amplifier unit 715 in some cases.

The data processing unit 701 generates, in transmission in which data is input from a protocol upper layer (not illustrated), a packet for wireless transmission from the data, and performs the processing of adding a header for media access control (MAC) and an error detection code. The data processing unit 701 provides the post-processing data to the modulation/demodulation unit 711 in the communication unit 703. In contrast to this, in reception in which there is input from the modulation/demodulation unit 711, the data processing unit 701 performs, for example, MAC header analysis, packet error detection, and reorder processing, and provides the post-processing data to its own protocol upper layer.

The control unit 702 controls information exchange between the units in the communication apparatus 700. Further, the control unit 702 sets the parameters of the modulation unit 711 and the signal processing unit 712, and makes packet scheduling in the data processing unit 701. Further, the control unit 702 sets the parameters of the wireless interface unit 714 and the amplifier unit 715, and controls transmission electric power.

When the communication apparatus 700 operates as a base station to transmit frames such as high-resolution video data by multicasting to a plurality of terminals, the control unit 702 controls the operation of the communication apparatus 700 as follows: the communication apparatus 700 performs the processing of transmitting a trigger frame for inducing ACK/NACK signal transmission to each terminal that is a transmission destination, and frame retransmission processing based on an ACK/NACK signal received from each terminal, to thereby realize high-efficiency and high-quality multicast communication.

Further, in a case where the communication apparatus 700 operates as a terminal, the control unit 702 controls the operation of the communication apparatus 700 as follows: the communication apparatus 700 performs the processing of receiving multicast frames transmitted from a base station that is a connection destination, and the processing of transmitting, in response to a trigger frame transmitted from the base station, an ACK/NACK signal with respect to each MPDU transmitted by multicasting. The ACK/NACK signal is transmitted using a candidate region randomly selected from the per-MPDU NACK region.

The modulation/demodulation unit 711 performs, in signal transmission, encoding, interleaving, and modulation on input data from the data processing unit 701 on the basis of a coding and modulation scheme set by the control unit 702, to thereby generate a data symbol stream. The modulation/demodulation unit 711 provides the data symbol stream to the signal processing unit 712. Further, the modulation/demodulation unit 711 performs, in signal reception, processing reverse to the one in transmission on input from the signal processing unit 712, and provides the reception data to the data processing unit 701 or the control unit 702.

The signal processing unit 712 performs, in signal transmission, signal processing on input from the modulation/demodulation unit 711, and provides the obtained one or more transmission symbol streams to each of the wireless interface units 714. Further, the signal processing unit 712 performs, in signal reception, signal processing on reception symbol streams input from each of the wireless interface units 714, and provides the resultant to the modulation/demodulation unit 711.

Note that, the signal processing unit 712 performs, as needed, spatial processing such as spatial multiplexing processing of a plurality of streams in signal transmission, or spatial resolution processing of a plurality of reception signal streams in signal reception. Thus, the channel estimation unit 713 calculates, from the preamble portion and training signal portion of an input signal from each of the wireless interface units 714, complex channel gain information regarding the propagation path. The calculated complex channel gain information is used in the demodulation processing by the modulation/demodulation unit 711 and the spatial processing by the signal processing unit 712 through the control unit 702.

The wireless interface unit 714 converts, in signal transmission, input from the signal processing unit 712 into an analog signal, filters the analog signal, and upconverts the analog signal to a carrier wave frequency. The wireless interface unit 714 sends the resultant to the antenna 716 or the amplifier unit 715. Further, the wireless interface unit 714 performs, in signal reception, the reverse processing on input from the antenna 716 or the amplifier unit 715, and provides the data to the signal processing unit 712 and the channel estimation unit 713.

The amplifier unit 715 amplifies, in signal transmission, an analog signal input from the wireless interface unit 714 to a predetermined electric power, and sends the resultant to the antenna 716. Further, the amplifier unit 715 performs, in signal reception, low-noise amplification on a signal input from the antenna 716 such that the signal takes a predetermined electric power, and outputs the resultant to the wireless interface unit 714. The wireless interface unit 714 has at least one of the transmission function or the reception function of the amplifier unit 715 in some cases.

The power supply unit 704 includes a battery power supply or a fixed power supply, and supplies electric power to each unit in the communication apparatus 700.

INDUSTRIAL APPLICABILITY

In the above, the technology disclosed herein has been described in detail with reference to the specific embodiments. However, it is obvious that those skilled in the art may make modifications or substitutions of the embodiments without departing from the gist of the technology disclosed herein.

The technology disclosed herein is applicable to, for example, wireless networks based on the IEEE 802.11 standard. Note that, the scope of application of the technology disclosed herein is not limited to a specific communication standard. In a case where there is a need to provide high-quality streaming service from one base station to an enormous number of terminals, the application of the technology disclosed herein enables each terminal to transmit ACK/NACK without complicated connection settings between the base station and each terminal (in other words, without the waste of wireless resources for connection settings). As a result, high-quality multicast communication can be realized.

In short, the technology disclosed herein has been described with the exemplary modes, and the contents described herein should not be interpreted in a limited manner. The claims should be taken into account in understanding the gist of the technology disclosed herein.

Note that, the technology disclosed herein can also take the following configurations.

(1) A communication apparatus including:
a communication unit configured to transmit and receive a signal; and
a control unit configured to control the transmission and reception of the signal,
in which the control unit controls transmission of an induction signal to one or more destination stations to each of which a signal has been transmitted, the induction signal inducing transmission of an acknowledgement/negative-acknowledgement signal with respect to the transmitted signal.

(2) The communication apparatus according to Item (1),
in which the communication apparatus transmits the signal to a plurality of destination stations, and
the induction signal contains information associated with a plurality of candidate regions with respect to which the acknowledgement/negative-acknowledgement signal is transmittable.

(2-1) The communication apparatus according to Item (2), in which the plurality of candidate regions is subjected to frequency-division multiplexing on the same time.

(3) The communication apparatus according to Item (2),
in which the signal contains a plurality of continuous frames, and
the induction signal contains information specifying frames that are acknowledgement/negative-acknowledgement targets.

(3-1) The communication apparatus according to Item (3), in which the information specifying the frames that are the acknowledgement/negative-acknowledgement targets includes information indicating a sequence number of a first frame of a group of the frames that are the acknowledgement/negative-acknowledgement targets and relative positions of other frames that are the acknowledgement/negative-acknowledgement targets.

(4) The communication apparatus according to Item (3), in which the induction signal contains information indicating the candidate regions for each of the frames that are the acknowledgement/negative-acknowledgement targets.

(5) The communication apparatus according to any one of Items (2) to (4), in which the induction signal contains information associated with a size of the candidate regions on a frequency axis.

(5-1) The communication apparatus according to Item (5), in which the induction signal further contains information specifying the frames that are the acknowledgement/negative-acknowledgement targets, and information associated with a size of an entire region usable in acknowledgement/negative-acknowledgement signal transmission on the frequency axis, and
the communication apparatus assigns, to an acknowledgement/negative-acknowledgement signal transmission region for each of the frames, each region obtained by dividing the entire region usable in acknowledgement/negative-acknowledgement signal transmission by the number of the frames that are the acknowledgement/negative-acknowledgement targets, and assigns, to the acknowledgement/negative-acknowledgement signal transmission region for each of the frames, candidate regions obtained by dividing the acknowledgement/negative-acknowledgement signal transmission region for each of the frames by a size of a candidate region on the frequency axis.

(6) The communication apparatus according to any one of Items (3) to (5), in which the control unit determines retransmission priority of each of the frames based on the number of received acknowledgement/negative-acknowledgement signals.

(7) The communication apparatus according to Item (6), in which the control unit adjusts, depending on an acknowledgement/negative-acknowledgement signal reception status, a width of the candidate regions on a frequency axis or a total number of candidate regions per frame.

(8) The communication apparatus according to Item (7), in which when there is no difference in number of received acknowledgement/negative-acknowledgement signals, the control unit reduces a size of the candidate regions on the frequency axis or increases the number of candidate regions assigned to each of the frames.

(9) The communication apparatus according to any one of Items (1) to (8), in which the communication apparatus operates as a base station to transmit a multicast signal to a plurality of terminal stations under an influence of the base station, and to transmit the induction signal for inducing transmission of an acknowledgement/negative-acknowledgement signal with respect to the multicast signal.

(10) A communication method including:
a step of transmitting a signal to a destination station; and
a step of transmitting an induction signal to the destination station, the induction signal inducing transmission of an acknowledgement/negative-acknowledgement signal with respect to the signal.

(11) A communication apparatus including:
a communication unit configured to transmit and receive a signal; and
a control unit configured to control the transmission and reception of the signal,
in which the control unit controls transmission of an acknowledgement/negative-acknowledgement signal in response to reception of an induction signal for inducing the transmission of the acknowledgement/negative-acknowledgement signal.

(12) The communication apparatus according to Item (11), in which the control unit selects any one of a plurality of candidate regions specified by the induction signal, and causes the acknowledgement/negative-acknowledgement signal to be transmitted.

(12-1) The communication apparatus according to Item (12), in which the plurality of candidate regions is subjected to frequency-division multiplexing on the same time.

(13) The communication apparatus according to Item (11) or (12),
in which the communication unit receives a multicast signal, and
the control unit controls transmission of an acknowledgement/negative-acknowledgement signal with respect to frames of the multicast signal specified as acknowledgement/negative-acknowledgement targets by the induction signal.

(13-1) The communication apparatus according to Item (13), in which the induction signal contains information indicating a sequence number of a first frame of a group of the frames that are the acknowledgement/negative-acknowledgement targets and relative positions of other frames that are the acknowledgement/negative-acknowledgement targets.

(14) The communication apparatus according to Item (13), in which the induction signal induces the transmission of the acknowledgement/negative-acknowledgement signal using a candidate region for each of the frames indicated by the induction signal.

(15) The communication apparatus according to any one of Items (11) to (14), in which the control unit causes an acknowledgement/negative-acknowledgement signal having a size of a candidate region specified by the induction signal on a frequency axis to be transmitted.

(15-1) The communication apparatus according to Item (15),
in which the induction signal further contains information specifying frames that are acknowledgement/negative-acknowledgement targets, and information associated with a size of an entire region usable in acknowledgement/negative-acknowledgement signal transmission on the frequency axis, and
the control unit selects any one of candidate regions obtained by dividing, by the size of the candidate region on the frequency axis, an acknowledgement/negative-acknowledgement signal transmission region for each of the frames that are the acknowledgement/negative-acknowledgement targets, the acknowledgement/negative-acknowledgement signal transmission region being obtained by dividing the entire region usable in acknowledgement/negative-acknowledgement signal transmission by the number of the frames, and causes the acknowledgement/negative-acknowledgement signal to be transmitted.

(16) The communication apparatus according to any one of Items (11) to (15), in which the communication apparatus operates as a terminal connected to a base station, and transmits, in response to reception of the induction signal from the base station, an acknowledgement/negative-acknowledgement signal with respect to a multicast signal transmitted from the base station.

(17) A communication method including:
a step of receiving a signal; and
a step of transmitting an acknowledgement/negative-acknowledgement signal with respect to the signal in response to reception of an induction signal for inducing the transmission of the acknowledgement/negative-acknowledgement signal.

REFERENCE SIGNS LIST

700 . . . Communication apparatus, 701 . . . Data processing unit, 702 . . . Control unit, 703 . . . Communication unit, 704 . . . Power supply unit, 711 . . . Modulation/demodulation unit, 712 . . . Signal processing unit, 713 . . . Channel estimation unit, 714 . . . Wireless interface unit, 715 . . . Amplifier unit, 716 . . . Antenna

The invention claimed is:
1. A communication apparatus comprising:
circuitry configured to
transmit a signal to a plurality of destination stations, the signal including a plurality of continuous frames;
control the transmission and reception of the signal; and
control transmission of an induction signal to one or more destination stations to each of which a signal has been transmitted, the induction signal inducing transmission of an acknowledgement/negative-acknowledgement signal with respect to the transmitted signal,
wherein the induction signal contains information associated with a plurality of candidate regions with respect to which the acknowledgement/negative-acknowledge- ment signal is transmittable and information specifying frames that are acknowledgement/negative-acknowledgement targets, wherein the induction signal contains information indicating the candidate regions for each of the frames that are the acknowledgement/negative-acknowledgement targets.

2. The communication apparatus according to claim 1, wherein the induction signal contains information associated with a size of the candidate regions on a frequency axis.

3. The communication apparatus according to claim 1, wherein the circuitry is configured to determine retransmission priority of each of the frames based on the number of received acknowledgement/negative-acknowledgement signals.

4. The communication apparatus according to claim 3, wherein the circuitry is configured to adjust, depending on an acknowledgement/negative-acknowledgement signal reception status, a width of the candidate regions on a frequency axis or a total number of candidate regions per frame.

5. The communication apparatus according to claim 4, wherein when there is no difference in number of received acknowledgement/negative-acknowledgement signals, the circuitry is configured to reduce a size of the candidate regions on the frequency axis or increases the number of candidate regions assigned to each of the frames.

6. The communication apparatus according to claim 1, wherein the communication apparatus operates as a base station to transmit a multicast signal to a plurality of terminal stations under an influence of the base station, and to transmit the induction signal for inducing transmission of an acknowledgement/negative-acknowledgement signal with respect to the multicast signal.

7. A communication method comprising:
transmitting a signal to a plurality of destination stations, the signal including a plurality of continuous frames;
transmitting an induction signal to the destination station, the induction signal inducing transmission of an acknowledgement/negative-acknowledgement signal with respect to the signal, and the induction signal including information associated with a plurality of candidate regions with respect to which the acknowledgement/negative-acknowledgement signal is transmittable and information specifying frames that are acknowledgement/negative-acknowledgement targets; and
determining retransmission priority of each of the frames based on the number of received acknowledgement/negative-acknowledgement signals.

8. A communication apparatus comprising:
circuitry configured to
transmit and receive a signal;
receive a multicast signal; and
control the transmission and reception of the signal,
wherein the circuitry is configured to control transmission of an acknowledgement/negative-acknowledgement signal in response to reception of an induction signal for inducing the transmission of the acknowledgement/negative-acknowledgement signal,
wherein the circuitry is configured to control transmission of the acknowledgement/negative-acknowledgement signal with respect to frames of the multicast signal specified as acknowledgement/negative-acknowledgement targets by the induction signal,
wherein the transmission of the acknowledgement/negative-acknowledgement signal is induced based on the induction signal using a candidate region for each of the frames indicated by the induction signal.

9. The communication apparatus according to claim 8, wherein the circuitry is configured to select any one of a plurality of candidate regions specified by the induction signal and causes the acknowledgement/negative-acknowledgement signal to be transmitted.

10. The communication apparatus according to claim 8, wherein the acknowledgement/negative-acknowledgement signal has a size of a candidate region specified by the induction signal on a frequency axis to be transmitted.

11. The communication apparatus according to claim 8, wherein the communication apparatus operates as a terminal connected to a base station, and transmits, in response to reception of the induction signal from the base station, an acknowledgement/negative-acknowledgement signal with respect to a multicast signal transmitted from the base station.

12. A communication method for a communication apparatus, comprising:
receiving a signal;
receiving a multicast signal;
transmitting the acknowledgement/negative-acknowledgement signal with respect to the signal in response to reception of an induction signal for inducing the transmission of the acknowledgement/negative-acknowledgement signal; and
controlling transmission of the acknowledgement/negative-acknowledgement signal with respect to frames of the multicast signal specified as acknowledgement/negative-acknowledgement tar gets by the induction signal, the induction signal inducing the transmission of the acknowledgement/negative-acknowledgement signal using a candidate region for each of the frames indicated by the induction signal.

\* \* \* \* \*